United States Patent
Matsuo

(10) Patent No.: US 7,606,922 B2
(45) Date of Patent: Oct. 20, 2009

(54) INFORMATION PROCESSING SERVER, INFORMATION PROCESSING SYSTEM, INFORMATION PROCESSING METHOD AND STORAGE MEDIUM STORING INFORMATION PROCESSING PROGRAM

(75) Inventor: Takenori Matsuo, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 461 days.

(21) Appl. No.: 11/488,662

(22) Filed: Jul. 19, 2006

(65) Prior Publication Data
US 2007/0022181 A1 Jan. 25, 2007

(30) Foreign Application Priority Data
Jul. 21, 2005 (JP) ............................. 2005-211365

(51) Int. Cl.
*G06F 15/16* (2006.01)
*G06F 15/173* (2006.01)

(52) U.S. Cl. .................. 709/230; 709/217; 709/225; 709/236

(58) Field of Classification Search ........ 709/203, 709/212, 217, 225, 230, 236
See application file for complete search history.

(56) References Cited

U.S. PATENT DOCUMENTS

| | | | | |
|---|---|---|---|---|
| 6,944,763 B1 * | 9/2005 | Asano et al. | ................ | 713/168 |
| 6,975,726 B2 * | 12/2005 | Asano et al. | ................ | 380/255 |
| 7,073,061 B2 * | 7/2006 | Asano et al. | ................ | 713/168 |
| 7,134,023 B2 * | 11/2006 | Asano et al. | ................ | 713/182 |
| 7,171,562 B2 * | 1/2007 | Brown et al. | ................ | 713/182 |
| 7,273,252 B2 * | 9/2007 | Iijima et al. | ................ | 297/284.3 |
| 7,305,452 B2 * | 12/2007 | Sakatani | ................ | 709/217 |
| 7,380,120 B1 * | 5/2008 | Garcia | ................ | 713/160 |
| 7,418,101 B2 * | 8/2008 | Nobel et al. | ................ | 380/243 |
| 7,454,327 B1 * | 11/2008 | Neubauer et al. | ........ | 704/200.1 |
| 2003/0088517 A1 * | 5/2003 | Medoff | ................ | 705/59 |
| 2006/0253724 A1 | 11/2006 | Zhang | | |

FOREIGN PATENT DOCUMENTS

CN 1549157 A 11/2004

OTHER PUBLICATIONS

"eBooks security—theory and practice," Presentation on DEF CON Nine, Jul. 13-15, 2001, USA.

* cited by examiner

*Primary Examiner*—Moustafa M Meky
*Assistant Examiner*—Sargon N Nano
(74) *Attorney, Agent, or Firm*—Oliff & Berridge, PLC

(57) ABSTRACT

An information processing server including: a file storage section that stores a data file; a specification section that specifies processing restriction information for restricting at least one of saving processing and printing processing of the data file at a client device that is connected to the information processing server via a network; a restriction information storage section that stores the processing restriction information that is specified; and a transmission section that, when transmission of the data file is requested by the client device, transmits file management information including the processing restriction information for the data file that has been stored at the restriction information storage section, and the data file that has been stored at the file storage section, to the client device via the network, is provided.

8 Claims, 7 Drawing Sheets

FIG. 5

```
GET /XXXX/XXXXXXXXXX.xdw HTTP/1.1
Accept: */*
User-Agent:XXXX
Host:xxxx.xxx.xxxx.co.jp
Cache-Control:no-cache HTTP/1.1 200 OK
Server:xxxxxxx
```
PROCESSING RESTRICTION INFORMATION → (Disable-SaveUI:T)
```
Date:XXXXXXXX 2005
Content-Type:application/XXXX
Accept-Ranges:bytes
Last-Modified:xxxxxxx 2004
xxxxxxxxxxxxxxxxxxxxxxxxxxxx
Content-Length:xxx
```

INFORMATION PROCESSING SERVER, INFORMATION PROCESSING SYSTEM, INFORMATION PROCESSING METHOD AND STORAGE MEDIUM STORING INFORMATION PROCESSING PROGRAM

BACKGROUND

1. Technical Field

This invention relates to an information processing server, an information processing system, an information processing method, and a storage medium storing an information processing program, and more particularly relates to an information processing server, information processing system, information processing method and information processing program storage medium for displaying a data file, stored at an information processing server, at a client device.

2. Related Art

In recent years, there have been information processing systems in which document files are stored at a server such as a Web server or the like and, when a document file is to be viewed, a client device can access the server and display that document file. With such an information processing system, because the document files are collectively stored at the server, administration of the document files can be simplified and burdens on administrative staff can be ameliorated.

Anyway, with the recent enactment of personal data protection laws, cases in which a leakage of information would be regarded as a problem have apparently become more numerous.

However, with the information processing system described above, if a copy of the displayed document file is saved at the client device or the displayed document file is printed out at the client device, it will not be possible to prevent a leak of information.

SUMMARY

The present invention provides an information processing server, information processing system and information processing program storage medium which are capable, in relation to a data file stored at a server, of preventing a leakage of information through a client device. An aspect of the present invention provides an information processing server including: a file storage section that stores a data file; a specification section that specifies processing restriction information for restricting at least one of saving processing and printing processing of the data file at a client device that is connected to the information processing server via a network; a restriction information storage section that stores the processing restriction information that is specified; and a transmission section that, when transmission of the data file is requested by the client device, transmits file management information including the processing restriction information for the data file that has been stored at the restriction information storage section, and the data file that has been stored at the file storage section, to the client device via the network.

BRIEF DESCRIPTION OF THE DRAWINGS

FIG. 5 is an image view of an HTTP header relating to the exemplary embodiment.

DETAILED DESCRIPTION

Herebelow, an exemplary embodiment will be described with reference to the drawings.

Figure 1:
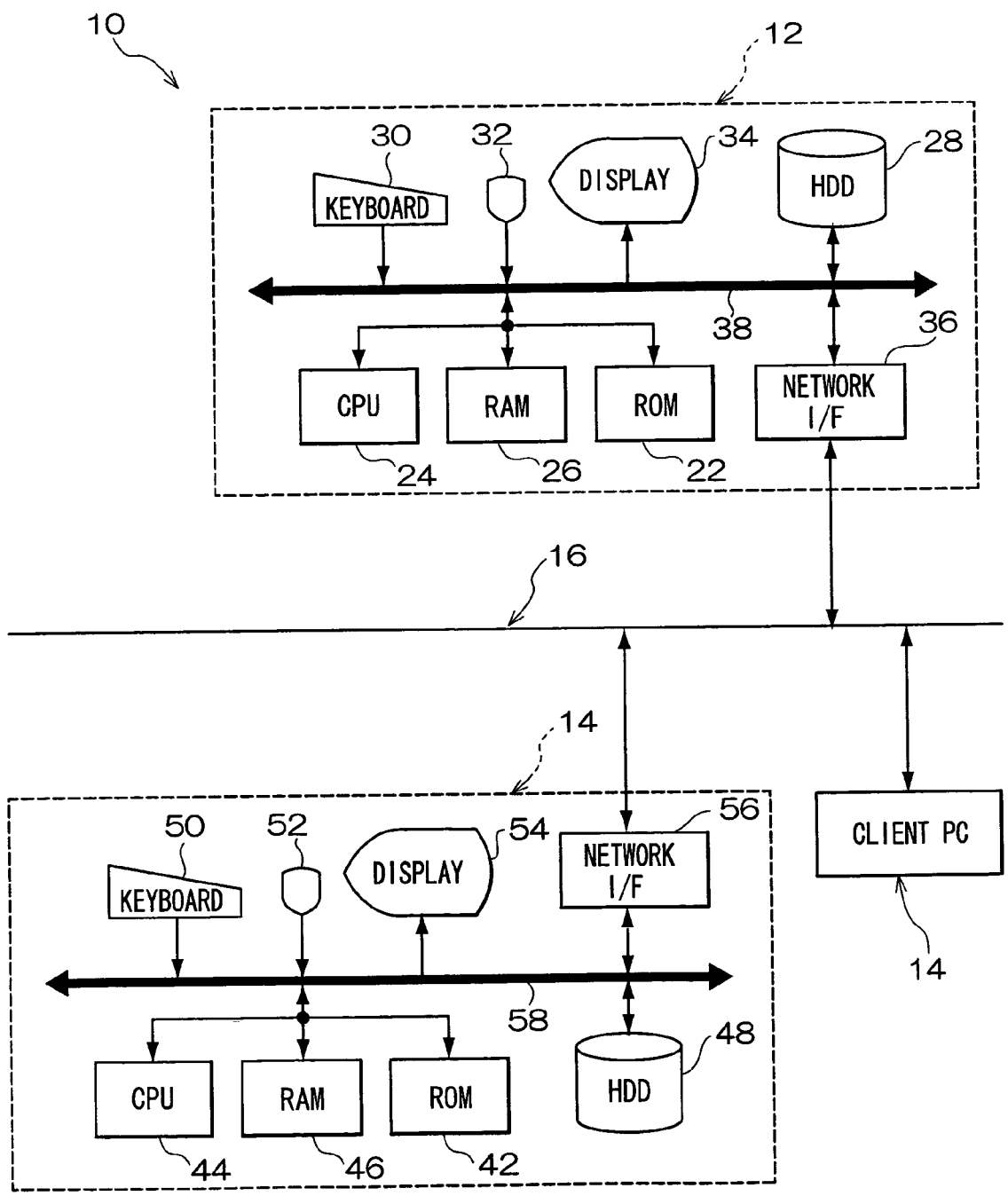
FIG. 1 is a schematic view showing structure of an information processing system relating to an exemplary embodiment.

As shown in FIG. 1, an information processing system 10 relating to an embodiment of the present invention is provided with a Web server 12, client PCs 14 and a network 16, such as a LAN or the like. The Web server 12 and the client PCs 14 are connected through the network 16.

The Web server 12 is provided with: ROM 22 that serves as a storage medium at which various programs, parameters and the like are stored, including a program which executes a server side processing routine, which will be described later; a CPU 24 that executes the various programs; RAM 26 used as a work area during execution of the various programs by the CPU 24, and suchlike; an HDD 28 that stores inputted document files; a keyboard 30; a mouse 32; a display 34; a network interface 36 for connecting the Web server 12 with the network 16; and a bus 38 for connecting all these to one another.

Processing restriction information, for restricting processes applied to the document files at the client PCs 14, is also stored at the HDD 28 and the processing restriction information is stored separately for each document file. Processes which are restricted by the processing restriction information include, for example, processing for saving at the client PCs 14, processing for printing, etc. Further, a number of users are registered at the HDD 28 in advance and the processing restriction information can be made to specify whether or not to restrict processing by individual users.

Meanwhile, the client PC 14 is provided with: ROM 42 that serves as a storage medium at which various programs, parameters and the like are stored, including a program which executes a client side processing routine, which will be described later, and a browser program for displaying document files; a CPU 44 that executes the various programs; RAM 46 employed as a work area during execution of the various programs by the CPU 44, and suchlike; an HDD 48; a keyboard 50; a mouse 52; a display 54; a network interface 56 for connecting the client PC 14 with the network 16; and a bus 58 for connecting all these to one another.

Herein, for the Web server 12, a Web server with a conventionally known ordinary structure may be employed. Therefore, for the present exemplary embodiment, descriptions relating to other structures of the Web server 12 will not be given. Moreover, for the client PC 14, a personal computer with a previously known ordinary structure can be employed, and descriptions relating to other structures of the client PC 14 will not be given for the present exemplary embodiment.

Next, operation of the present embodiment of the invention will be described. Herebelow, a case in which saving processing is restricted will be described.

Figure 2:
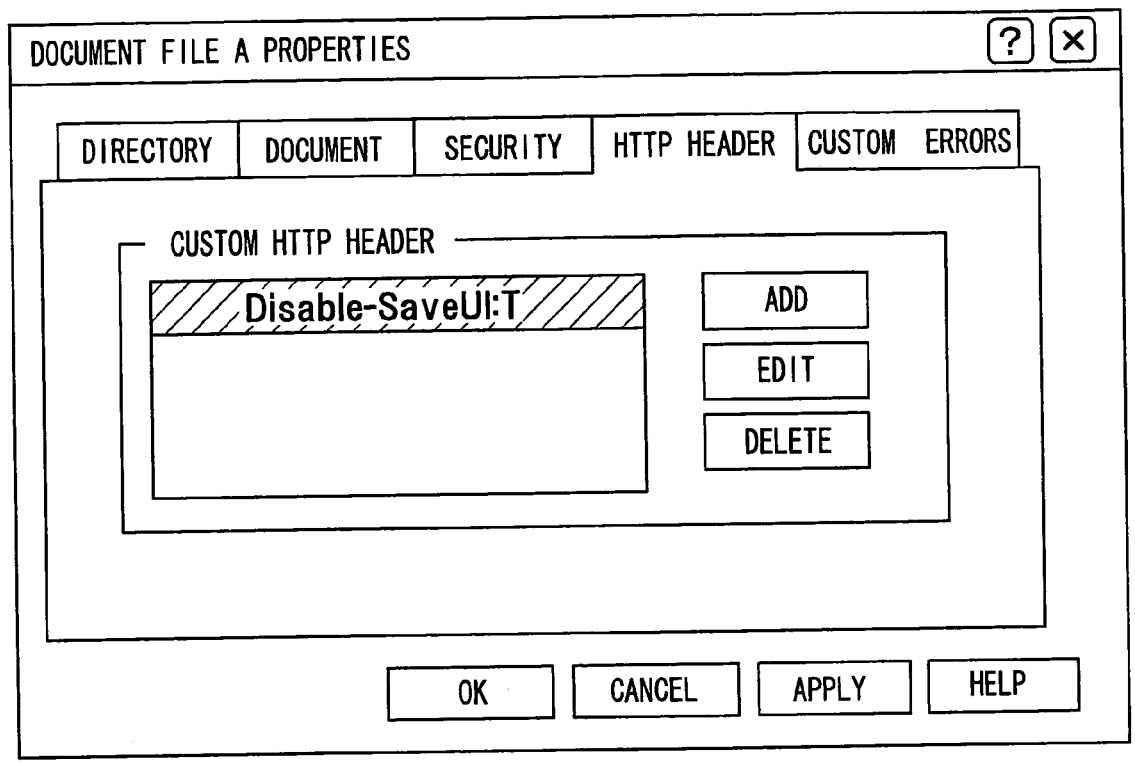
FIG. 2 is an image view of a screen for setting information of processing restrictions, relating to the exemplary embodiment.

Initially, at the Web server 12, an operator stores document files in the HDD 28 by operating the keyboard 30 and the mouse 32, or document files are inputted from the client PCs 14 via the network and stored in the HDD 28. The operator performs operations to cause the properties screen shown in FIG. 2 to be displayed at the display 34 and, for a particular document file (in FIG. 2, document file A), sets the processing restriction information so as to restrict saving processing for saving a copy of the file at the client PC 14 and/or printing processing. Hence, the processing restriction information is stored at the HDD 28. Further, whether or not saving processing by specific individual users is restricted can be specified for the document file in the processing restriction information. It is possible to select a user from the plural users that have been registered beforehand, and specify so as to restrict saving processing for the selected user.

The processing restriction information can be specified for individual folders containing pluralities of document files. When processing restriction information is specified for a particular folder, it is possible to set restrictions on saving processing, printing processing and the like for all document files contained in the folder. When, for example, the processing restriction information is specified for a particular folder, processing restriction information is generated separately for each document file contained in the folder, and this processing restriction information is stored at the HDD 28 in correspondence with the document files. Further, when a document file is moved or stored into a folder for which the processing restriction information has been specified, processing restriction information for the document file that is newly contained in the folder is generated on the basis of the processing restriction information specified for the folder, and is stored in the HDD 28.

In the present embodiment, a protocol for communications between the client PCs 14 and the Web server is HTTP, and the processing restriction information is stored in the HDD 28, so as to be added to an HTTP header which is transmitted prior to transmission of communication data. The HTTP header can be edited. As shown in FIG. 5, there is a portion representing information for administering the document file in the HTTP header, and the processing restriction information is added to this portion.

Figure 3:
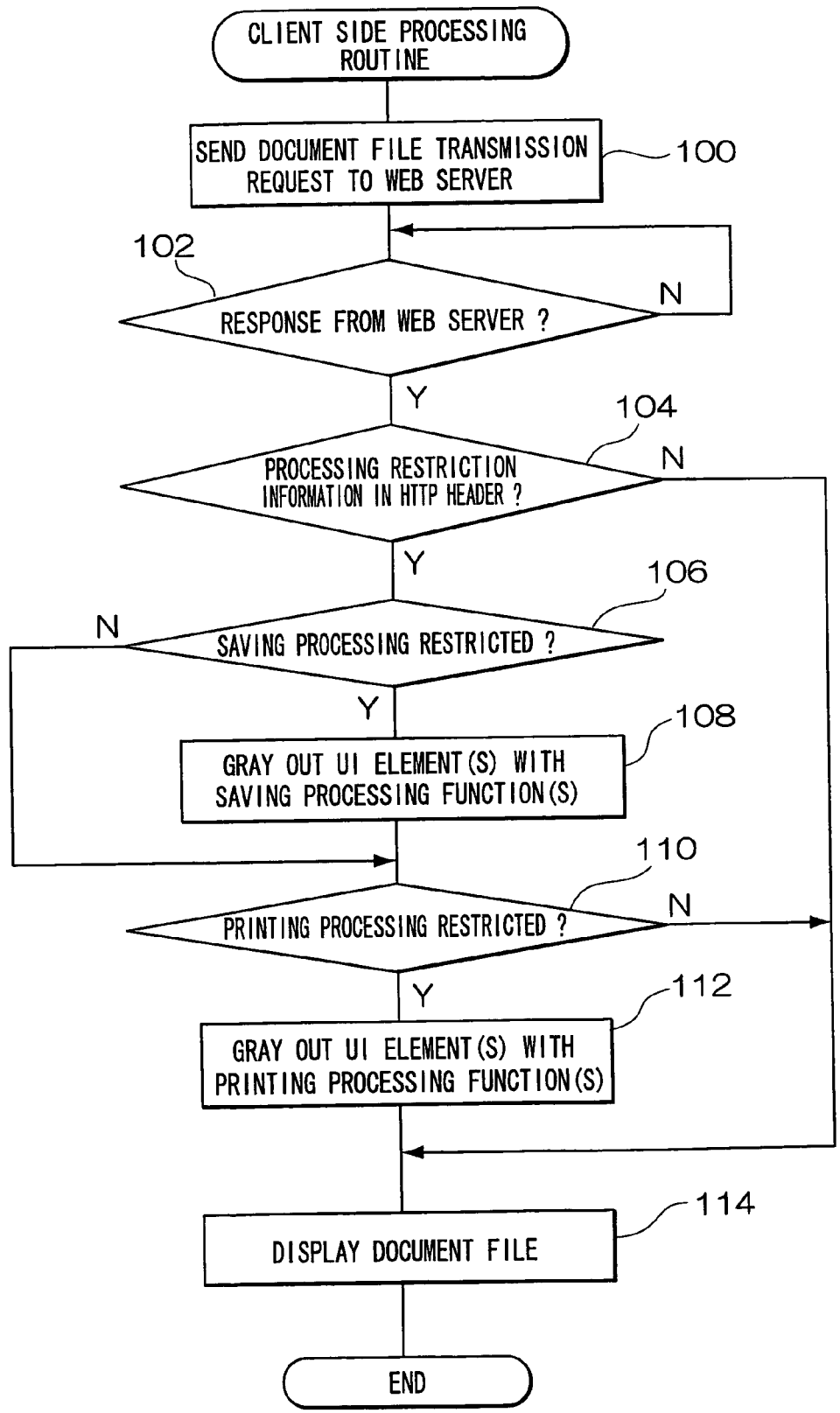
FIG. 3 is a flowchart showing details of a client side processing routine at a client PC, relating to the exemplary embodiment.

Subsequently, the client side processing routine shown in FIG. 3 is executed at the client PC 14. First, in step 100, the browser program is launched and, in order to display a certain document file (for example, document file A), a request for transmission of document file A is sent to the Web server 12.

Figure 4:
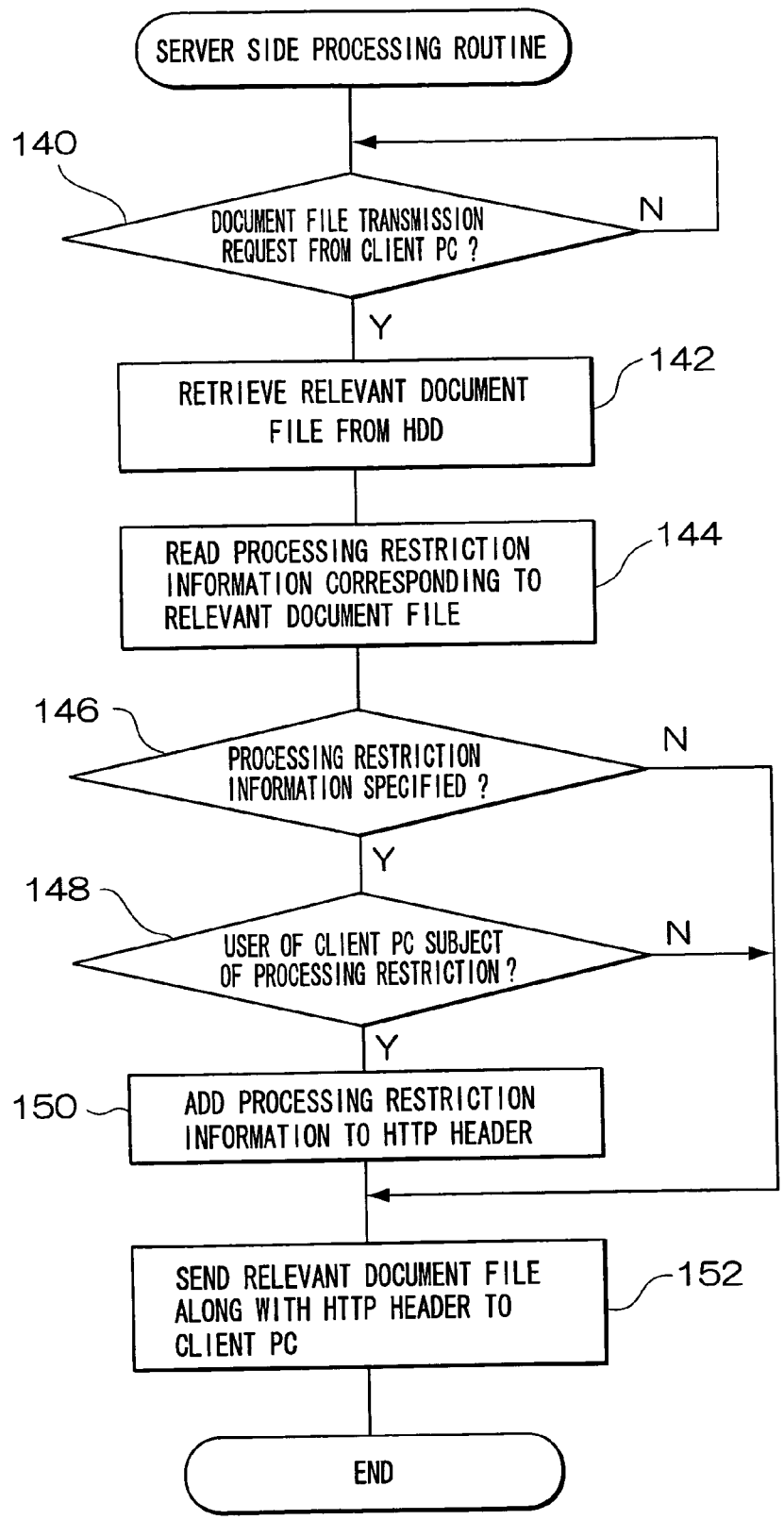
FIG. 4 is a flowchart showing details of a server side processing routine at a Web server, relating to the exemplary embodiment.
Figure 6:
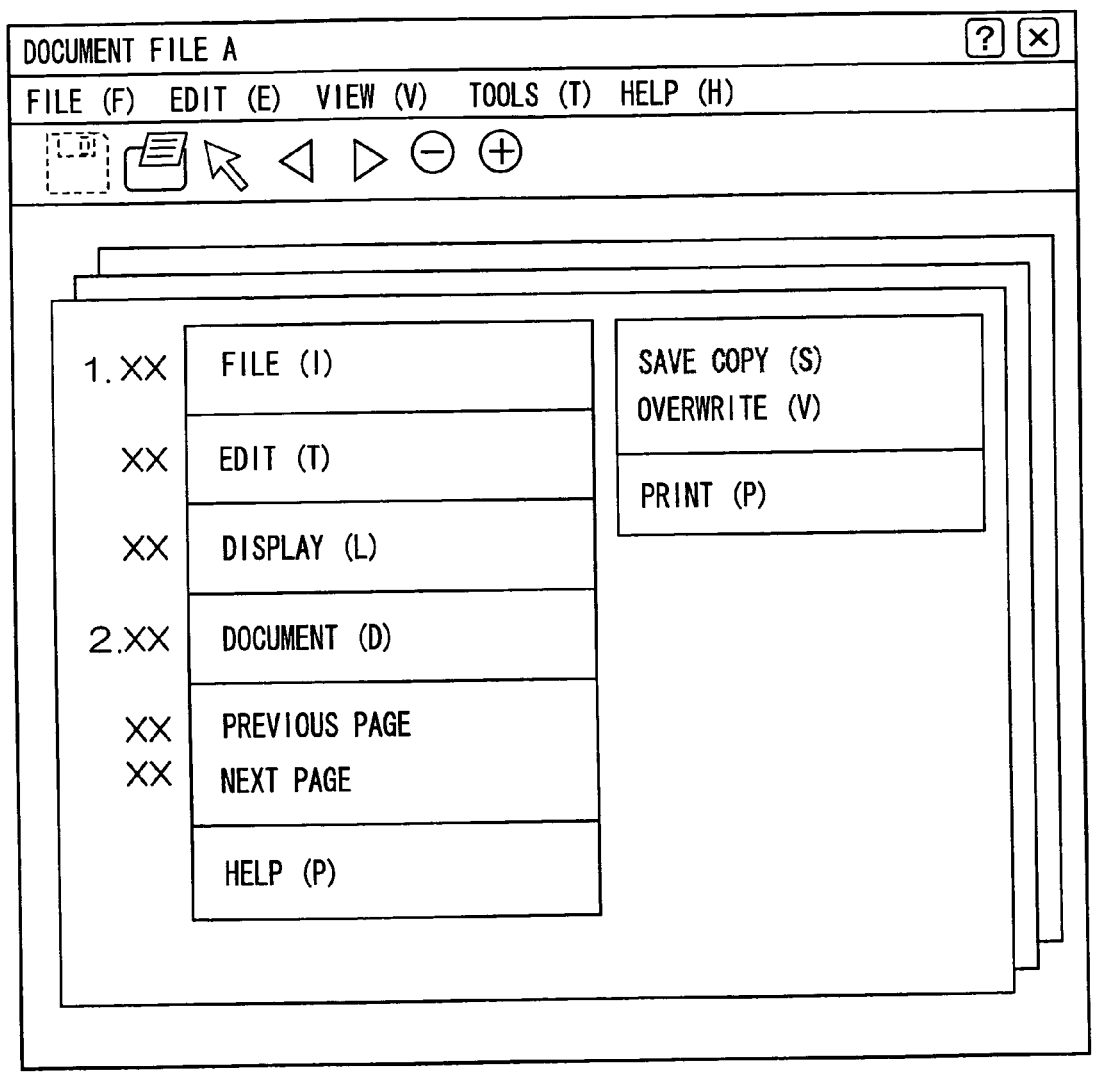
FIG. 6 is an image view of a screen for display of a document file at the client PC, relating to the exemplary embodiment.

Meanwhile, the server side processing routine shown in FIG. 4 is executed at the Web server 12. First, in step 140, it is determined whether or not there has been a document file transmission request from the client PCs 14. When, for example, the transmission request for document file A is transmitted from the client PC 14, the routine advances from step 140 to step 142, and the corresponding document file A is read out from the HDD 28.

Then, in step 144, the processing restriction information corresponding to the relevant document file A is read out from the HDD 28, and in step 146, it is determined whether or not processing restriction information has been specified. If processing restriction information has not been specified, the routine advances to step 152. On the other hand, if processing restriction information has been specified, as in the screen shown in FIG. 2, in step 148 it is determined from the processing restriction information whether or not the user of the client PC 14 that implemented the document file transmission request of step 140 is a subject of a restriction of saving processing. If the user of the client PC 14 is not a restriction subject, the routine advances to step 152. On the other hand, if the user has been selected as a restriction subject or if all users are a restriction subject, in step 150, processing restriction information such that a saving processing restriction flag is set to on, as shown in FIG. 5, is added to the HTTP header.

Then, in step 152, both the HTTP header and the document file A are sent to the client PC 14, and the server side processing routine ends.

At the client PC 14, in step 102 of the client side processing routine shown in FIG. 3, it is determined whether or not there has been a response from the Web server 12. When the document file A together with the HTTP header is sent from the Web server 12, in step 104, the HTTP header is analyzed, and it is determined whether or not processing restriction information which restricts saving processing and/or printing processing is included therein. If processing restriction information is not included in the HTTP header, the routine advances to step 114. On the other hand, when the processing restriction information is included in the HTTP header, in step 106, it is determined whether or not the processing restriction information represents a restriction of saving processing. If processing restriction information in which the saving processing restriction flag is turned on is not included, the routine advances to step 110. On the other hand, when the processing restriction information in which the saving processing restriction flag is turned on is included, in step 108, a user interface element with a saving processing function (for example, a button or a menu item) is grayed out so as to be unusable, and it will not be possible to instruct saving processing.

Then, in step 110, it is determined whether or not the processing restriction information represents a restriction of printing processing. If processing restriction information in which a printing processing restriction flag is turned on is not included, the routine advances to step 114. On the other hand, if processing restriction information in which the printing processing restriction flag is turned on is included, in step 112, a user interface element with a printing processing function (for example, a button or a menu item) is grayed out so as to be unusable, and it will not be possible to instruct printing processing.

In the subsequent step 114, the document file A which was received in step 102 is displayed by the browser program, and the client side processing routine ends.

For the client PC 14 of the embodiment described above, a case in which a button, a menu item and/or the like is grayed out when saving processing or printing processing is restricted has been described as an example. Further, if it would be possible to instruct saving processing or the like in a dialog box which is displayed in response to a user operation, such as is shown in FIG. 7, a user interface element thereof such as a button or the like for instructing saving processing may be grayed out so as to be unusable, such that saving processing cannot be instructed.

Figure 7:
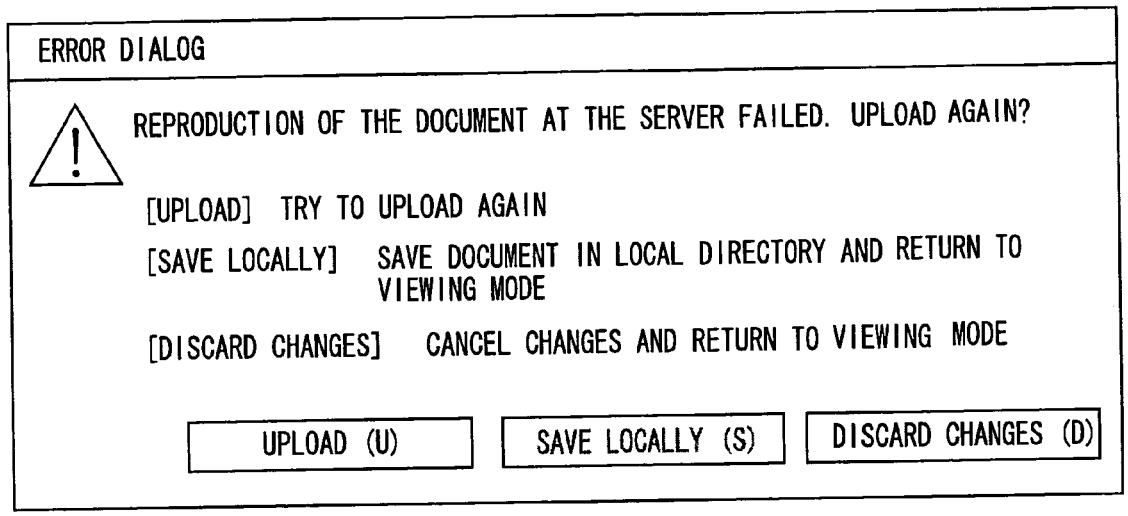
FIG. 7 is an image view of a dialog box at the client PC, relating to the exemplary embodiment.

Further still, as illustrated in FIG. 7, it is also possible to only restrict copy-saving processing, for saving a copy of the document file locally at the client PC 14, while allowing overwrite-saving processing, for updating the document file at the Web server 12. In such a case, a "Save locally" button alone may be grayed out, while an "Upload" button may be displayed as usual so as to be usable.

As has been described above, according to an information processing system relating to the exemplary embodiment, an HTTP header including processing restriction information for one or both of saving processing and printing processing is transmitted from a Web server to a client PC together with a document file. Thus, it is possible to restrict at least one of saving processing and printing processing of document files at client PCs. In consequence, it is possible to prevent leakages of information through the client PCs in relation to document files stored on the Web server.

Furthermore, since it is possible to specify processing restriction information at a folder level (unit), when processing restriction information is specified in folder level, it is possible to specify the processing restriction information for all data files contained in the folder. In consequence, a burden on an operator can be lightened.

Moreover, because it is possible to specify processing restriction information for each of users, it is possible to alter details of the processing restriction information in accordance with users. In consequence, convenience can be improved.

As other exemplary embodiments, a method for executing processing as described above at the information processing server described above, and a storage medium at which a program for executing the same is stored, can be provided.

As yet another exemplary embodiment, an information processing system equipped with an information processing server, a client device, and a network connecting the information processing server with the client device can be provided. The information processing server includes: a file storage section which stores a data file; a specification section which specifies processing restriction information for restricting at least one of saving processing and printing processing of the data file at the client device; a restriction information storage section which stores the processing restriction information that has been specified; and a transmission section which, when transmission of the data file is requested by the client device, transmits file management information including the processing restriction information for the data file, which processing restriction information has been stored at the restriction information storage section, and the data file, which has been stored at the file storage section, to the client device, via the network. The client device includes: a request section which requests transmission of the data file from the information processing server; an acquisition section which acquires, from the information processing server, the file management information for the data file whose transmission has been requested and the data file; a display section which displays the acquired data file; and a restriction section which restricts the at least one of saving processing and printing processing of the displayed data file on the basis of the restriction processing information included in the acquired file management information.

According to this information processing system, at the information processing server, the processing restriction information for restricting one or both of saving processing and printing processing of a data file at the client device which is connected via the network is specified from the specification section, and the processing restriction information which has been specified by this specification section is stored at the restriction information storage section.

Then, the information processing server is requested to transmit the data file by the request section of the client device.

At the information processing server, when transmission of the data file is requested by the client device, the transmission section sends the file management information including the processing restriction information for the data file, which was stored at the restriction information storage section, with the data file, which was stored at the file storage section, through the network to the client device.

At the client device, the acquisition section acquires, from the information processing server, the file management information for the data file whose transmission was requested and the data file and the display section displays the data file acquired by the acquisition section. In addition, the restriction section restricts the at least one of saving processing and printing processing of the data file that is displayed by the display section, in accordance with the processing restriction information included in the file management information acquired by the acquisition section.

Therefore, by sending the file management information which includes the processing restriction information for restricting at least one of saving processing and printing processing together with the data file from the information processing server to the client device, it is possible to restrict the at least one of saving processing and printing processing of the data file at the client device. Consequently, it is possible to prevent leakages of information through the client device in relation to data files stored on the information processing server.

The above-mentioned file management information may be header information which is transmitted before communication data is transmitted, in a protocol of communications between the information processing server and the client device.

Further, the above-mentioned restriction section may restrict the at least one of saving processing and printing processing of the data file by making it impossible to use a user interface to perform commands for saving processing or printing processing.

In the above-described exemplary embodiment, a case in which the processes which can be restricted are saving processing and printing processing has been described. However, the present invention can also be applied to restricting annotation addition processing, page manipulation processing, authentication processing and so forth. In such a case, information representing restrictions of such processes can be set in the processing restriction information.

What is claimed is:

1. An information processing server comprising:
   a file storage section that stores a data file;
   a specification section that specifies processing restriction information for restricting at least one of saving processing and printing processing of the data file at a client device that is connected to the information processing server via a network;
   a restriction information storage section that stores the processing restriction information that is specified; and
   a transmission section that, when transmission of the data file is requested by the client device, transmits file management information including the processing restriction information for the data file that has been stored at the restriction information storage section, and the data file that has been stored at the file storage section, to the client device via the network,
      wherein a communication protocol between the information processing server and the client device is an HTTP protocol, and the file management information is included in an HTTP header of the data file by the information processing server and transmitted to the client device together with the data file.

2. The information processing server of claim 1, further comprising a folder specification section that, in a folder level in which a plurality of data files are contained, specifies the processing restriction information for all data files contained in the folder.

3. The information processing server of claim 1, further comprising a user storage section that stores a plurality of users, wherein the specification section specifies the processing restriction information for each of the users stored at the user storage section.

4. An information processing system comprising:
an information processing server;
a client device; and
a network connecting the information processing server and the client device, wherein the information processing server includes:
   a file storage section that stores a data file;
   a specification section that specifies processing restriction information for restricting at least one of saving processing and printing processing of the data file at the client device;
   a restriction information storage section that stores the processing restriction information that is specified; and
   a transmission section that, when transmission of the data file is requested by the client device, transmits file management information including the processing restriction information for the data file that has been stored at the restriction information storage section, and the data file that has been stored at the file storage section, to the client device via the network,
and the client device includes:
   a request section that requests transmission of the data file from the information processing server;
   an acquisition section that acquires, from the information processing server, the file management information for the data file whose transmission has been requested and the data file;
   a display section that displays the acquired data file; and
   a restriction section that restricts at least one of saving processing and printing processing of the displayed data file on the basis of the restriction processing information included in the acquired file management information,
   wherein a communication protocol between the information processing server and the client device is an HTTP protocol, and the file management information is included in an HTTP header of the data file by the information processing server and transmitted to the client device together with the data file.

5. The information processing system of claim 4, wherein the file management information comprises header information that is transmitted before communication data is transmitted, in a protocol of communications between the information processing server and the client device.

6. The information processing system of claim 4, wherein the restriction section restricts the at least one of saving processing and printing processing of the data file by disabling a user interface to perform a command for saving processing or printing processing.

7. A storage medium storing a program of instructions executable by a computer to perform processing comprising:
storing a data file;
specifying processing restriction information for restricting at least one of saving processing and printing processing of the data file at a client device that is connected to the computer via a network;
storing the specified processing restriction information; and
when transmission of the data file is requested by the client device, transmitting file management information that includes the stored processing restriction information for the data file, and the stored data file, to the client device via the network,
   wherein a communication protocol between the computer and the client device is an HTTP protocol, and the file management information is included in an HTTP header of the data file by the computer and transmitted to the client device together with the data file.

8. An information processing method comprising:
storing a data file;
specifying processing restriction information for restricting at least one of saving processing and printing processing of the data file at a client device that is connected via a network;
storing the specified processing restriction information; and
when transmission of the data file is requested by the client device, transmitting file management information that includes the stored processing restriction information for the data file, and the stored data file, to the client device via the network,
   wherein a communication protocol to the client device is an HTTP protocol, and the file management information is included in an HTTP header of the data file and transmitted to the client device together with the data file.

* * * * *